July 15, 1958   E. F. KIERNAN   2,843,726
METHOD FOR THE FABRICATION OF VERY SMALL THERMOCOUPLES
Filed Feb. 18, 1955

INVENTOR.
EARL F. KIERNAN
BY George Sipkin
George E. Pearson
ATTORNEYS

United States Patent Office

2,843,726
Patented July 15, 1958

2,843,726

METHOD FOR THE FABRICATION OF VERY SMALL THERMOCOUPLES

Earl F. Kiernan, San Diego, Calif.

Application February 18, 1955, Serial No. 489,310

7 Claims. (Cl. 219—117)

(Granted under Title 35, U. S. Code (1952), sec. 266)

The invention described herein may be manufactured and used by or for the Government of the United States of America for governmental purposes without the payment of any royalties thereon or therefor.

This invention relates to method for the fabrication of very small thermo-couples and in particular to a method for fabrication of thermo-couples having overall dimensions less than a quarter wavelength of sound in water at one megacycle frequency so that they will not distort the field when inserted in it.

Heretofore thermo-couple elements have been welded with electrical circuits in which the thermo-couple is inserted into a container filled with an inert gas. One method of uniting the two wires of different melting points is to extend one wire beyond the junction of the two so that it extends further into the heating zone. A globule of molten metal is formed by fusion of the projecting length of the longer wire and is drawn by capillarity into the spaces between the two twisted wires, welding them together. Another method is to include the twisted wires forming the thermo-couple elements in a series D. C. circuit with a variable resistor. A thin carbon rod, also connected in series, is momentarily brought in contact with the wires and quickly withdrawn. The wires will melt at the end and fuse together as the arc extinguishes itself.

These methods of fabricating thermo-couples, however, have disadvantages in that oxidation occurs during fusing, the size of the globule cannot be accurately controlled and the weld does not have uniform characteristics necessary for dependable service. Thermo-couples of the size fabricated by the method of this invention are easily damaged when fabricated by these methods and the number acceptable as compared to those assembled is quite low.

The method employed by this invention permits the wires to be handled with facility and with infrequent breakage. This method embraces a novel way of twisting the wires comprising the thermo-couple and electrically welding them in mercury under an oil bath to prevent oxidation on the wires which destroys the desired uniform weld characteristic.

An object of this invention is to provide a method for fabricating thermo-couples with wires having overall dimensions less than a quarter wavelength at one megacycle frequency of sound in water.

A further object is the provision of a method of fabricating thermo-couples having uniform weld characteristics.

A further object is the provision of a method of fabricating thermo-couples in which the size of the welding globule can be controlled and in which oxidation during welding is prevented.

A further object is the provision of a method of fabrication of very small thermo-couples in which the thermo-couples may be easily removed from the fabricating apparatus without damage.

Other objects and many of the attendant advantages of this invention will be readily appreciated as the same becomes better understood by reference to the following detailed description when considered in connection with the accompanying drawings wherein.

Figure 3:
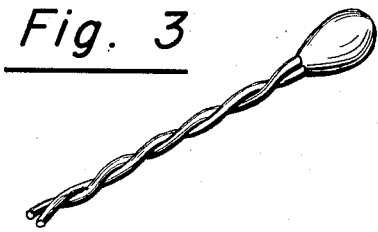
Fig. 3 shows the welded thermo-couple in which the fusing globule is too large.
Figure 1:
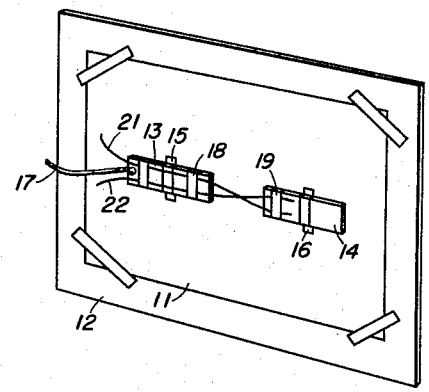
Fig. 1 shows the assembly of parts prior to twisting the wires.

The thermo-couple fabricated by the method of this invention consists of copper and constantan wire of one mil thickness welded together. This thermo-couple has overall dimensions of less than a quarter wavelength of sound in water at one megacycle frequency so as not to distort the field when inserted in it. The sound energy which strikes the thermocouple is converted into heat which produces a small voltage. This voltage can be amplified and measured on a meter. The meter readings can then be correlated in terms of sound intensity.

The constantan wire used is bare and requires no preparation. The copper wire is enameled. To remove the enamel, twelve inch lengths of the wire are fastened to a sheet of Bakelite. The wires are mounted, parallel and taut, about three or four diameters apart under one quarter inch strips of masking tape across the ends. A sheet of paper is slid under the wires near one end to act as a catch-all for the enamel removing solvent. The solvent is applied with a flat toothpick to a two inch section adjacent to one end. Considerable pressure is applied to the tooth-pick while moving it back and forth parallel to the length of the wires while at the same time the wires are rolled back and forth along a longitudinal axis with one finger. Close observation will enable the manipulator to ascertain when the enamel has been removed. A clean sheet of paper is placed under the wires and they are scrubbed with a cloth saturated with carbon tetrachloride while being rotated under a finger. They can be removed from the sheet as needed by cutting the individual wires adjacent to the masking tape strips with a sharp knife. Another method of cleaning the copper wire is to wrap it around a larger wire, heating it to redness in a flame and quenching immediately in alcohol. The prepared wires should be used the same day, otherwise oxidation interferes with the welding operation.

To join the wires preparatory to welding the following arrangement is used. A sheet of paper 11 is fastened to a flat surface, such as a 12″ x 12″ x ¼″ square of Bakelite 12, by narrow strips of masking tape placed diagonally across the corners. Two strips of sheet brass 13 and 14 of dimensions 1″ x 3″ x ¹⁄₆₄″ with smooth edges and rounded corners, are fastened to the paper near the center with strips of masking tape 15, 16 across the short dimension near the middle of the strip. The pieces are positioned with the longer edges parallel and the adjacent ends opposite and aproximately 1¼″ apart. One brass strip 13 has the adjacent flat end surface polished for approximately ½″ with very fine emery cloth to remove the oxide. A copper wire insulated conductor 17 is soldered to the other end. Three pieces of masking tape about 1″ x ¼″ are fastened to the brass strips as follows: a strip 18, 19 is fastened across each of the adjacent ends of the two brass strips 13, 14 by pressing on a ¼″ section of the tape in the center, the end of the tape should curl up and clear the brass. Care should be taken that the tape does not touch the outer area on the end of the polished brass strip as the film of adhesive left on the brass will prevent the wires from making good electrical contact. The third piece of tape is similarly fastened to the polished brass strip 13 near the lead 17. The one mil wires 21, 22 are fastened to the brass strips by placing one end of the wire under the tape strip on the end of the unpolished brass strip 14 parallel to the longer dimension and approximately ⅛" from the edge, the wire extending out in the direction of the polished strip. The tape 19 is pressed down firmly to anchor the wire. The wire is carried diagonally across the space beween the adjacent ends of the brass strips and anchored to the polished strip by means of the other two strips of tape. The two wires 21, 22, when thus mounted, will cross in the center of the space between the adjacent ends of the two brass strips. The unpolished brass strip 14 is unfastened from the paper sheet by removing the tape strip 16 across its center. The brass strip is then carefully picked up in the fingers and rotated 12 to 18 full turns about its longer axis, and then carefully replaced in its original position on the paper sheet 11. This operation is possible without too much danger of breaking the fine wires if reasonable care is exercised. The paper sheet 11 has enough "give" to make this practical. The unpolished brass strip 14 is separated from the twisted wires by cutting the wires with a sharp knife near the end of the twisted portion nearest it. The polished strip 13 with the twisted wires 21, 22 mounted on it can be released from the paper sheet 11 by cutting through the strip of masking tape 15 along each side of the brass. The brass strip 13 serves as a convenient handle to manipulate the twisted wires during the welding process and also affords a good electrical connection to both wires. It is important that both wires make good contact with the brass strip 13, otherwise the current will melt one wire if it carries the full current. The method just described allows the wires to be handled with facility and infrequent breakage.

Figure 4:
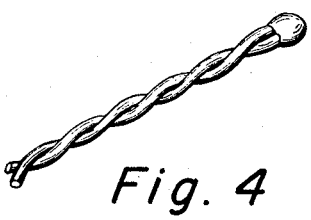
Fig. 4 shows the welded thermo-couple in which the fused globule is the correct size.
Figure 2:
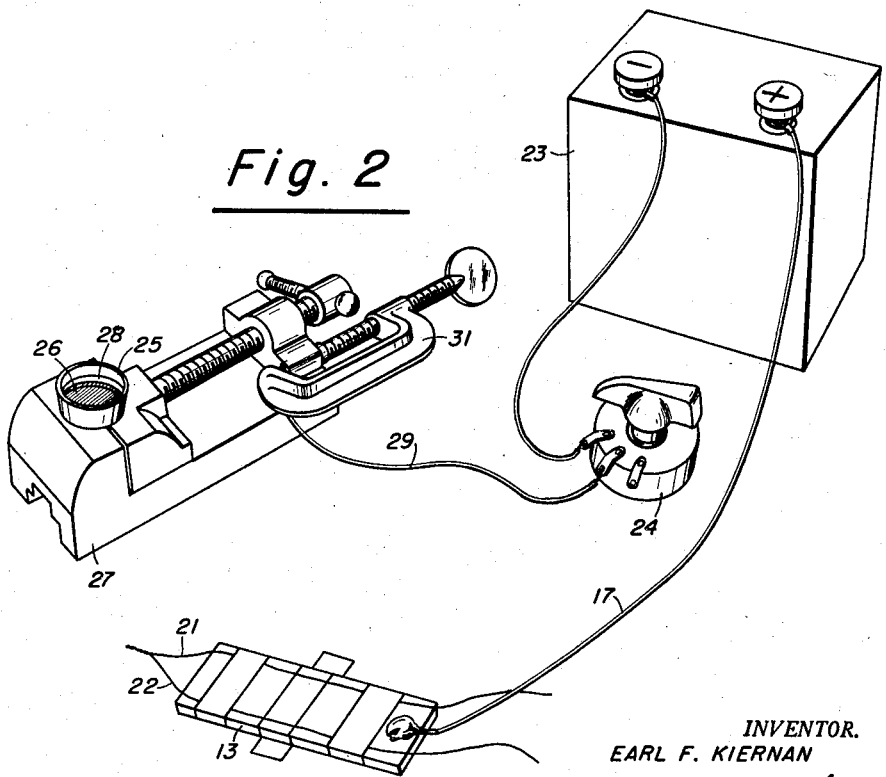
Fig. 2 shows the electrical circuit used in the welding operations.

To weld the wires together the following are needed: one heavy duty 22.5 volt radio "B" battery 23 (or equivalent) one 50 ohm rheostat 24, and a small cup 25 containing mercury 26, and the necessary wires to connect them in series as shown in Fig. 2. While any suitable method of connecting the cup 25 to one arm of the rheostat 24 may be used, in this instance readily available machine shop equipment is used. For example, the cup may be a metal screw cap from a small bottle with a brass angle soldered to the bottom. The cup may be clamped in a small machinist's vise 27 and half filled with mercury. A layer of light oil 28 should be placed over the mercury to exclude air from the arc. A conductor 29 may be fastened to the machinist's vise by means of a small C clamp 31. The conductor 17 from the polished brass strip 13 is connected to the plus terminal of the battery 23, and the vise 27, in series with the rheostat 24, to the other battery terminal. The polished brass strip 13 is held in one hand and slowly lowered so as to bring the end of the twisted pair of wires 21, 22 into contact with the mercury. A bright arc together with a sharp hissing sound will be in evidence when the polarity of the battery is correct and the rheostat has been adjusted properly. Too much current will produce too large an amount of metal at the weld as shown in Fig. 3. A correct weld is shown in Fig. 4.

A thirty power binocular microscope is necessary to inspect the wires and welds and to enable the manipulator to view the operation of removing the twist in the wires up to the weld. This latter operation can be accomplished by placing the welded wires on the glass stage of the microscope with the weld positioned in the center of the field of view and slowly pulling the wires apart. This pulling operation is accomplished by pressing each wire down against the glass with a finger while at the same time moving the fingers in opposite directions. If the weld is good and care is exercised, the twist can be removed right up to the weld. The kinks left in the wires may be ironed out by sliding the end of a toothpick over the wire while the weld is clamped to the glass with another tooth-pick.

Thermo-couples thus fabricated are mounted at the end of ¼" diameter glass tubing which had the bore reduced to a diameter of approximately .003". The couple was imbedded in wax which also sealed the end of the glass tube.

Obviously many modifications and variations of the present invention are possible in the light of the above teachings. It is therefore to be understood that within the scope of the appended claims the invention may be practiced otherwise than as specifically described.

What is claimed is:

1. A method of fabricating thermo-couples of fine wire comprising the step of passing a welding current through at least the ends of a pair of twisted thermo-couple leads in series with a mercury bath contacting said ends and having an oil surface seal.

2. A method of fabricating thermo-couples of fine wire comprising the step of passing a welding current through a liquid conductor liquid sealed against oxidation and through at least the ends of a pair of twisted wires in contact therewith.

3. A method of fabricating thermo-couples of fine wire comprising the steps of applying a potential from one side of a potential source to a pair of wires, juxtaposing portions of said wires, applying a potential from the other side of said potential source to a bath of liquid conductor liquid sealed against oxidation, inserting said juxtaposed portions through the liquid seal into contact with said liquid conductor to complete the circuit from said source through said wires and said bath.

4. A method of fabricating thermo-couples of fine wire comprising the steps of twisting the ends of two wires together, connecting both wires to a voltage potential of a source of supply, connecting an oil covered pool of mercury to a different voltage potential of said source, and contacting the twisted ends of said wires with said mercury to permanently weld said ends under oil.

5. A method of fabricating thermo-couples of fine wire comprising the steps of conductively fastening two fine wires to a piece of conductive material in spaced relationship and overlapping one end thereof, twisting the overlapping ends of said wires together, applying a potential from a source of supply to an oil covered pool of mercury and a different potential from said source to said piece of conductive material, inserting said twisted overlapping wire ends into said oil covered pool to contact said mercury and permanently weld said wires under oil.

6. A method of fabricating thermo-couples of fine wire comprising the steps of placing two thin pieces of conductive sheet material in spaced apart relation, fastening two fine wires in conductive engagement with one of said pieces of conductive material, fastening the same two wires to the other of said pieces of material, relatively rotating said pieces a plurality of turns to twist said wires about each other, cutting said wires near the twisted end nearest the other of said pieces of material thereby leaving a twisted coupling of the two wires conductively attached to and in spaced relation from said one piece, applying a voltage potential to a pool of oil covered mercury, applying a different voltage potential to said piece of sheet material in conductive engagement with said wires inserting the twisted tips of said wires through said oil into contact with said mercury to permanently weld said wires under oil, and completing an electric circuit through said potentials, mercury and wires.

7. A method of fabricating thermo-couples of fine wire comprising the steps of fastening a sheet of flexible insulating material to a hard flat surface into surface-to-surface engagement, releasably fastening two thin pieces of flexible conductive sheet material in spaced apart relation onto said insulating material with pressure sensitive tape, releasably fastening two fine wires in conductive engagement with said pieces of conductive sheet material, releasing one of said conductive pieces of sheet material from said insulating sheet and rotating it a plurality of turns about an axis substantially parallel with said wires, cutting said wires near the end of the twisted portion thereof thereby separating the two pieces of sheet material and leaving a twisted coupling of the two wires attached to and in spaced relation from one of the two pieces, cutting the pressure sensitive tape to release said last mentioned piece of conductive sheet material, applying a voltage potential from a voltage source to a pool of oil covered mercury, applying a different voltage potential from said source to said piece of conductive sheet material, and inserting the twisted tips of said wires into contact with said mercury to permanently weld said tips under oil.

References Cited in the file of this patent

UNITED STATES PATENTS

| | | |
|---|---|---|
| 1,055,261 | Ellinger | Mar. 4, 1913 |
| 1,490,438 | Stein | Apr. 5, 1924 |
| 2,244,455 | Gengenbach | June 3, 1941 |

FOREIGN PATENTS

| | | |
|---|---|---|
| 122,940 | Germany | May 5, 1900 |
| 558,472 | Great Britain | June 6, 1944 |